3,342,585
HERBICIDAL COMPOSITIONS AND PROCESS
Dean A. Brown, Hatboro, and Richard D. Hart, Gwynedd, Pa., assignors to Amchem Products, Inc., Ambler, Pa., a corporation of Delaware
No Drawing. Filed June 21, 1965, Ser. No. 465,711
12 Claims. (Cl. 71—118)

The present invention relates to compositions and processes for eradicating weeds, and more particularly it relates to a method of enhancing the activity of industrial herbicides by combining therewith a compound to form a composition which co-acts to yield a better than additive effect.

The biological effectiveness of a pesticidal agent is no longer the sole consideration in deciding whether or not to use the agent to accomplish the desired effect. It is becoming increasingly necessary in the use of industrial pesticides, including herbicides, to utilize smaller quantities of pesticides in order to reduce the tendency toward residual pesticides in the soil and/or plants to which the agent may have been applied. Lower usage of pesticides is also desirable from economic considerations since it results in a reduction of the costs involved in application.

The desire to use a smaller quantity of active herbicidal agent, while simultaneously maintaining a reasonable level of effectiveness, can only be realized when an agent is found which has appreciably greater activity, thereby permitting the application of lower dosages of chemical agent per acre of soil or plant surface.

Finding herbicidal agents which possess eminently higher degrees of activity is an ever increasingly difficult problem. In some areas herbicidal agents which could normally be used have been banned due to the likelihood of creating potentially harmful soil residues when such agents are applied at rates required for effecting weed control.

With the foregoing in mind the principal objects of the present invention is the provision of a method and composition for controlling weeds utilizing a combination of herbicidal agents which co-act to yield a better than additive result as compared with results obtained when such agents are used alone.

The present invention is based upon the surprising discovery that better than additive herbicidal results are realized when the compound N-(3′,4′-dichlorophenyl)-cyclopropane carboxamide, having the formula:

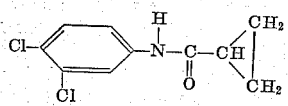

is admixed with an indane compound having the formula:

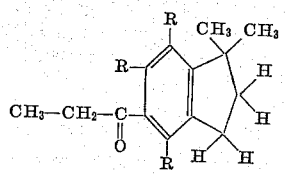

wherein R is hydrogen or an alkyl radical of from 1 to 3 total carbon atoms, with the proviso that at least two of the R substituents are alkyl; for application and use as a herbicidal composition as compared with results achieved utilizing either of these agents when employed alone.

The herbicidal compositions of this invention may contain any suitable amount of the respective herbicidally active components which will be required to perform a given function. The exact amounts of each of these agents can best be ascertained by those skilled in the art, and will depend upon such considerations as the type of weeds to be controlled, the age of the weeds being treated, the type of soil upon which the woods are growing and the time of year of application. In general, the compositions of this invention should contain from about 0.1 to 10.0 parts of indane compound per part by weight of N-(3′,4′-dichlorophenyl)-cyclopropane carboxamide. In any given instance the relative proportions of the active components utilized will vary, as noted above, upon the conditions of a given application. In any event, this combination of active herbicidal agents surprisingly has been found to result in better than additive effects than can be obtained when each compound is separately employed.

In order to illustrate the surprising results flowing from the present invention there are presented below a series of tests which clearly demonstrate the improvement realized in accordance with the teachings of this invention.

Hereinafter, in the tables and examples presented below the following key will be utilized for purposes of identifying the compounds reported therein:

A = N-(3′,4′-dichlorophenyl)-cyclopropane carboxamide
B = 1,1-dimethyl-4,6-diisopropyl-5-indanylethyl ketone
C = 1,1,4-trimethyl-6-isopropyl-5-indanylethyl ketone
D = 1,1-dimethyl-4,7-diisopropyl-5-indanylethyl ketone
E = 1,1,6,7-tetramethyl-4-isopropyl-5-indanylethyl ketone
F = 1,1,4,7-tetramethyl-6-isopropyl-5-indanylethyl ketone

EXAMPLE I

The compounds A and B, as identified above, were applied alone and in combination to areas which had been seeded with shattercane (Sorghum spp.) and mustard (Brassica kaber). At the time of application of these compounds, utilizing aqueous/alcohol solutions thereof, there was no noticeable plant growth in the test areas. Approximately five weeks after spray application an inspection of the treated areas showed the following results:

TABLE I

| Compound Used | Lbs./Acre | Percent Weed Control |
|---|---|---|
| A | 1 | 53 |
| B | 1 | 54 |
| A+B | 0.5+0.5 | 90 |

EXAMPLE II

Higher rates of the herbicidal agents were employed in areas which had been seeded with shattercane (Sorghum spp.) and mustard (Brassica kaber). Applications of the chemicals were made from acetone/water solutions thereof at a time when there was no noticeable plant growth in the test areas. Observations of the effects of these higher rates were made approximately five weeks following application of the chemicals to the soil surface and are recorded below in Table II.

TABLE II

| Compound Used | Lbs./Acre | Percent Weed Control |
|---|---|---|
| A | 2 | 58 |
| B | 2 | 69 |
| A | 4 | 70 |
| B | 4 | 87 |
| A+B | 0.5+0.5 | 90 |
| A+B | 1+1 | 97 |

From the results appearing in Tables I and II above, it is apparent that unexpectedly greater than additive results are obtained utilizing half, or less than half, of the respective herbicidal agents when such agents are employed in combination. For example, the separate 4-pound rates of compounds A and B, as utilized in Table II, each yielded a lower level of total percent weed control than did the utilization of 0.5 pound each of compounds A plus B, which latter combination resulted in 90% control of the undesirable vegetation. This observation being true notwithstanding the fact that only 25% of the active herbicidal ingredients were utilized in the combination tests. It is also apparent from Table II that a combination of 1 pound each of compounds A and B yielded 97% control of weed growth, whereas separate utilization of 2 pounds of each of the respective herbicidal agents resulted in less than 70% weed control in each instance.

Not only is it possible in accordance with the teachings of the present invention to reduce the total amount of herbicidal agent applied to the soil surface, but it is also possible to apply such combined herbicides to desirable crops which otherwise would be severely injured or totally destroyed by higher applications of such herbicidal agents. This is clearly demonstrated below in Example III.

EXAMPLE III

Application of compounds A and B were made separately at 4 pounds/acre rates, and were made in combinations each of 0.5 and 1 pound/acre rates to soil surfaces which had been freshly planted with corn (Zea maize), soybeans (Glycine maxima) and cotton (Gossypium hirsutum). At the time of application there was no noticeable plant growth in the test area. Results of this test, recorded five weeks after spray application are reported below in Table III.

TABLE III

| Compound | Rate, Lbs./Acre | Percent Crop Germination | | |
|---|---|---|---|---|
| | | Corn | Soybeans | Cotton |
| A | 4 | 80 | 70 | 90 |
| B | 4 | 65 | 95 | 65 |
| A+B | 0.5+0.5 | 100 | 100 | 100 |
| A+B | 1+1 | 100 | 100 | 100 |

From the foregoing results it is again apparent that appreciably reduced quantities of herbicidal agent can be utilized for purposes of controlling weeds while simultaneously permitting the growth of desirable, economic crops.

EXAMPLE IV

Compounds A and C were applied alone and in combination to foxtail (Setaria faberii). At the time of application, utilizing aqueous/alcohol solutions of the herbicidal agents, there was no noticeable plant growth in the test area. Approximately five weeks following spray application an inspection of the treated area showed the following results:

TABLE IV

| Compound Used | Lbs./Acre | Percent Weed Control |
|---|---|---|
| A | 0.5 | 40 |
| C | 0.5 | 30 |
| A+C | 0.5+0.5 | 95 |

EXAMPLE V

Compounds A and D were applied alone and in combination to areas which had been freshly seeded with Johnson grass (Sorghum halepense). Spray applications were made from aqueous/alcohol solutions of the chemical agents, and at the time of spraying there was no noticeable plant growth in the test area. Five weeks following spray application of the chemical agents to the soil surface inspection of the treated areas showed the following:

TABLE V

| Compound Used | Lbs./Acre | Percent Weed Control |
|---|---|---|
| A | 0.5 | 30 |
| D | 0.5 | 20 |
| A+D | 0.5+0.5 | 95 |

EXAMPLE VI

The compounds A and E were applied alone and in combination to areas which had been freshly seeded with barnyard grass (Echinochloa crusgalli). Spray applications were made using aqueous/acetone solutions of the chemical ingredients, and at the time of spraying there was no noticeable plant growth in the test area. Five weeks following spray application an inspection of the treated plots showed the following results:

TABLE VI

| Compound Used | Lbs./Acre | Percent Weed Control |
|---|---|---|
| A | 0.5 | 0 |
| A | 1 | 20 |
| E | 0.5 | 10 |
| A+E | 0.5+0.5 | 70 |
| A+E | 1+0.5 | 80 |

EXAMPLE VII

Compounds A and F were applied to fresh soil wherein there was seeded pigweed (Amaranthus retroflexus). At the time of spraying there was no noticeable plant growth in the test areas. Spray applications were conducted from water/alcohol solutions of the chemical agents, and approximately five weeks after spray application an inspection of the test area revealed the following:

TABLE VII

| Compound Used | Lbs./Acre | Percent Weed Control |
|---|---|---|
| A | 0.5 | 20 |
| F | 0.5 | 20 |
| F | 1 | 30 |
| A+F | 0.5+0.5 | 100 |

The results of the foregoing tables clearly demonstrate the surprising results which are better than additive when utilizing combinations of the individual herbicidal agents compared with results obtained when such agents are employed alone.

The compounds of this invention, being relatively insoluble in water, are preferably applied in the form of oil or solvent solutions thereof, or as emulsions in aqueous systems, or as dusts and granular formulations. Where oil or solvent solutions are desired, it is preferred to utilize such agricultural oils as methylated naphthylenes, alkylated benzenes, alcohols and ketones. Where aqueous emulsions are preferred it is customary to dissolve the herbicidal ingredients in an oil or solvent system and then emulsify the composition using a suitable surface active agent.

Granular formulations of the compounds of this invention may be prepared so as to contain from about 0.25% to about 80% by weight of the total active ingredients. Carriers suitable for such use include vermiculite, attapulgite and pyrophyllite. Where herbicidal dusts are to be prepared, it is customary to mill the powdered composition to a desired size, that is less than about 60 microns.

Solid carriers which may be used in the preparation of dust compositions of the compounds of this invention include clays, such as bentonites and china clay, naturally occurring minerals such as talc, quartz, fuller's earth, chalk and diatomaceous earth.

If desired, dispersible powder formulations may be prepared by incorporating into the dust compositions a suitable surface active agent such as, for example, alkyl sulfates and sulfonates and polyoxyethylene sulfates.

We claim:

1. A herbicidal composition comprising N-(3',4'-dichlorophenyl)-cyclopropane carboxamide and an indane compound having the formula:

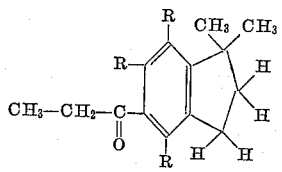

wherein R is selected from the group consisting of hydrogen and alkyl radicals of from 1 to 3 total carbon atoms, with the provision that at least two of the R substituents are alkyl radicals, the amount of the indane compound being from 0.1 to 10 parts thereof per part of the cyclopropane carboxamide.

2. The herbicidal composition of claim 1 wherein the indane compound is 1,1-dimethyl-4,6-diisopropyl-5-indanylethyl ketone.

3. The herbicidal composition of claim 1 wherein the indane compound is 1,1,4-trimethyl-6-isopropyl-5-indanylethyl ketone.

4. The herbicidal composition of claim 1 wherein the indane compound is 1,1-dimethyl-4,7-diisopropyl-5-indanylethyl ketone.

5. The herbicidal composition of claim 1 wherein the indane compound is 1,1,6,7-tetramethyl-4-isopropyl-5-indanylethyl ketone.

6. The herbicidal composition of claim 1 wherein the indane compound is 1,1,4,7-tetramethyl-6-isopropyl-5-indanylethyl ketone.

7. A process for the control of weed growth which comprises applying to the locus to be protected a herbicidally effective amount of a composition comprising N-(3',4'-dichlorophenyl)-cyclopropane carboxamide and an indane compound having the formula:

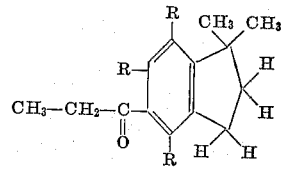

wherein R is selected from the group consisting of hydrogen and alkyl radicals of from 1 to 3 total carbon atoms, with the provision that at least two of the R substituents are alkyl radicals, the amount of the indane compound being from 0.1 to 10 parts thereof per part of the cyclopropane carboxamide.

8. The process of claim 7 wherein the indane compound is 1,1 - dimethyl - 4,6 - diisopropyl-5-indanylethyl ketone.

9. The process of claim 7 wherein the indane compound is 1,1,4 - trimethyl - 6 - isopropyl-5-indanylethyl ketone.

10. The process of claim 7 wherein the indane compound is 1,1 - dimethyl - 4,7 - diisopropyl-5-indanylethyl ketone.

11. The process of claim 7 wherein the indane compound is 1,1,6,7-tetramethyl - 4 - isopropyl-5-indanylethyl ketone.

12. The process of claim 7 wherein the indane compound is 1,1,4,7-tetramethyl - 6 - isopropyl-5-indanylethyl ketone.

References Cited

UNITED STATES PATENTS

| | | | |
|---|---|---|---|
| 3,277,107 | 10/1966 | Neighbors | 71—2.5 X |
| 3,278,622 | 10/1966 | Stofberg et al. | 260—668 |
| 3,283,016 | 11/1966 | Wood et al. | 71—2.3 |

LEWIS GOTTS, *Primary Examiner.*

J. O. THOMAS, Jr., *Examiner.*